United States Patent [19]

Homeier et al.

[11] Patent Number: 5,015,010

[45] Date of Patent: May 14, 1991

[54] SEAT INTEGRATED SEAT BELT SYSTEM

[75] Inventors: Ronald F. Homeier, Plainfield; Allan R. Lortz, Carmel; William L. Clifton, III, Lebanon; Jeffrey L. Williams, Zionsville, all of Ind.

[73] Assignee: Indiana Mills & Manufacturing, Inc., Westfield, Ind.

[21] Appl. No.: 491,537

[22] Filed: Mar. 12, 1990

[51] Int. Cl.$^5$ .............................................. B60R 21/16
[52] U.S. Cl. ..................................... 280/808; 297/483
[58] Field of Search ................. 280/801, 808; 297/486

[56] References Cited

U.S. PATENT DOCUMENTS

| 4,832,366 | 5/1989 | Corbett et al. | 280/808 |
| 4,840,404 | 6/1989 | Falterman | 280/808 |
| 4,846,498 | 7/1989 | Fohl | 280/808 |

*Primary Examiner*—Kenneth R. Rice

*Attorney, Agent, or Firm*—Woodard, Emhardt, Naughton, Moriarty & McNett

[57] ABSTRACT

A seat integrated seat belt system. A three point seat belt system includes a belt having one end affixed to the seat and an opposite end mounted to a retractor secured to the seat. A seat belt tongue is mounted to the belt intermediate the belt ends and is releasably lockable with a belt buckle on the opposite side of the seat thereby pulling one portion of the belt across the passenger lap and another portion of the belt across the passenger upper torso. The belt extends through a guide located at the top of the seat. A seat tether includes a second belt having one end attached to the seat at the location of the guide and a second end mounted to a second retractor located beneath the seat. The second retractor is operable to limit motion of the seat thereby minimizing the impact of vehicle motion on the first belt securing the passenger to the seat.

16 Claims, 6 Drawing Sheets

SEAT INTEGRATED SEAT BELT SYSTEM

BACKGROUND OF THE INVENTION

1. Field of the Invention

This invention is in the field of seat belt systems.

2. Description of the Prior Art

Seat belt systems are available combining a lap belt and upper torso belt. Typically, a single belt having its opposite ends mounted to a pair of retractors has a seat belt tongue mounted to the belt intermediate the belt ends. The tongue may then be swung across the person and engaged with a buckle affixed to the seat thereby positioning one portion of the belt across the lap and another portion of the belt across the upper torso. Instead of mounting both ends of the belt to a pair of retractors, some systems have only one end of the belt mounted to a retractor whereas the opposite end of the belt is affixed to the vehicle.

Rough riding equipment, such as trucks, provide special problems in relationship to seat belt systems. Slack inducing mechanisms are typically required to isolate the driver from belt pressure created by retractor lock up. Certain slack inducing mechanisms do not automatically provide for constant belt tensioning and constant belt pressure applied to the driver. The system disclosed herein reduces or eliminates the discomfort from belt pressure and cinching without the use of slack inducing mechanisms.

It has been the prior approach to increase the strength of the vehicle floor and seat in order to reduce the motion between the seat and vehicle which occurs during a crash. Such modifications are costly and require more expensive seats. Disclosed herein is a tether system which minimizes such relative motion while allowing for use of relatively inexpensive seats and elimination of any additional strengthening or rigidizing of the vehicle floor.

SUMMARY OF THE INVENTION

One embodiment of the present invention is a vehicle passenger restraint system comprising a passenger seat movable mounted in a vehicle with the passenger seat having a upwardly extending back support, a passenger belt releasably extending across the passenger operable to secure the passenger in the seat, and, a web mounted to the vehicle and passenger seat and including a first portion secured to the back support and a second portion secured to the vehicle, the web operable to extend and retract as the seat controllably moves relative to the vehicle but further operable to limit movement of the back support relative to the vehicle during emergency stops.

Another embodiment of the present invention is a tether for holding a vehicle passenger seat with a back portion comprising a tether assembly mountable to a vehicle and a passenger seat therein, the tether assembly including an extendable and retractable web extending between the passenger seat and the vehicle with the tether assembly being operable via the web to allow relative motion between the passenger seat and the vehicle during passenger adjustment but limiting relative motion during emergency stops.

It is an object of the present invention to provide an integrated seat belt system which reduces or eliminates the discomfort from belt pressure and cinching without the use of slack inducing mechanisms.

A further object of the present invention is to provide a vehicle passenger restraint system to minimize belt movement normally resulting from normal vehicle motion.

A further object of the present invention is to provide a tether for holding a vehicle passenger seat to insure constant seat belt pressure relative to the passenger.

Related objects and advantages of the present invention will be apparent from the following description.

DESCRIPTION OF THE PREFERRED EMBODIMENT

Figure 1:
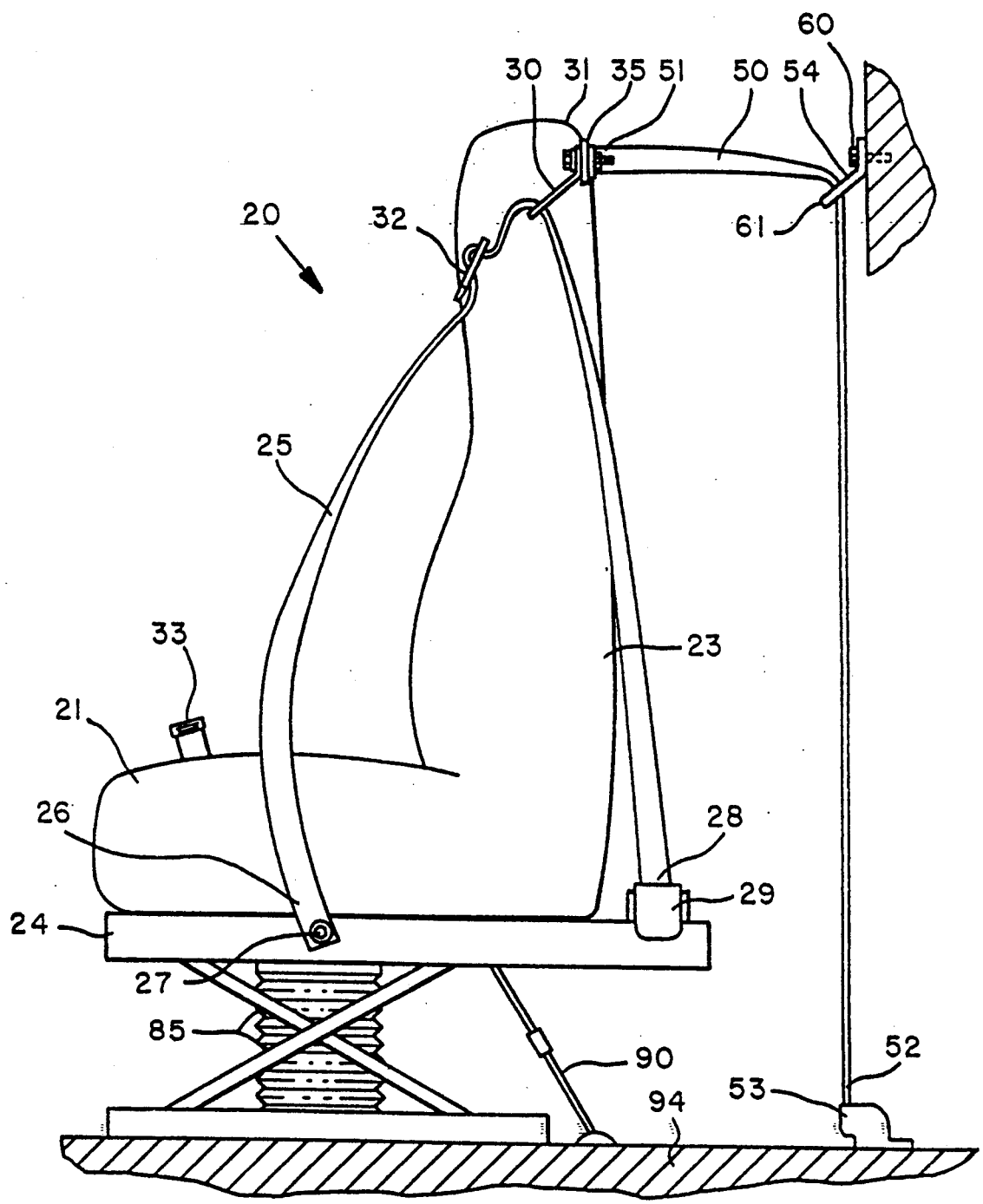
FIG. 1 is a side view of a vehicle seat and associated seat belt system incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
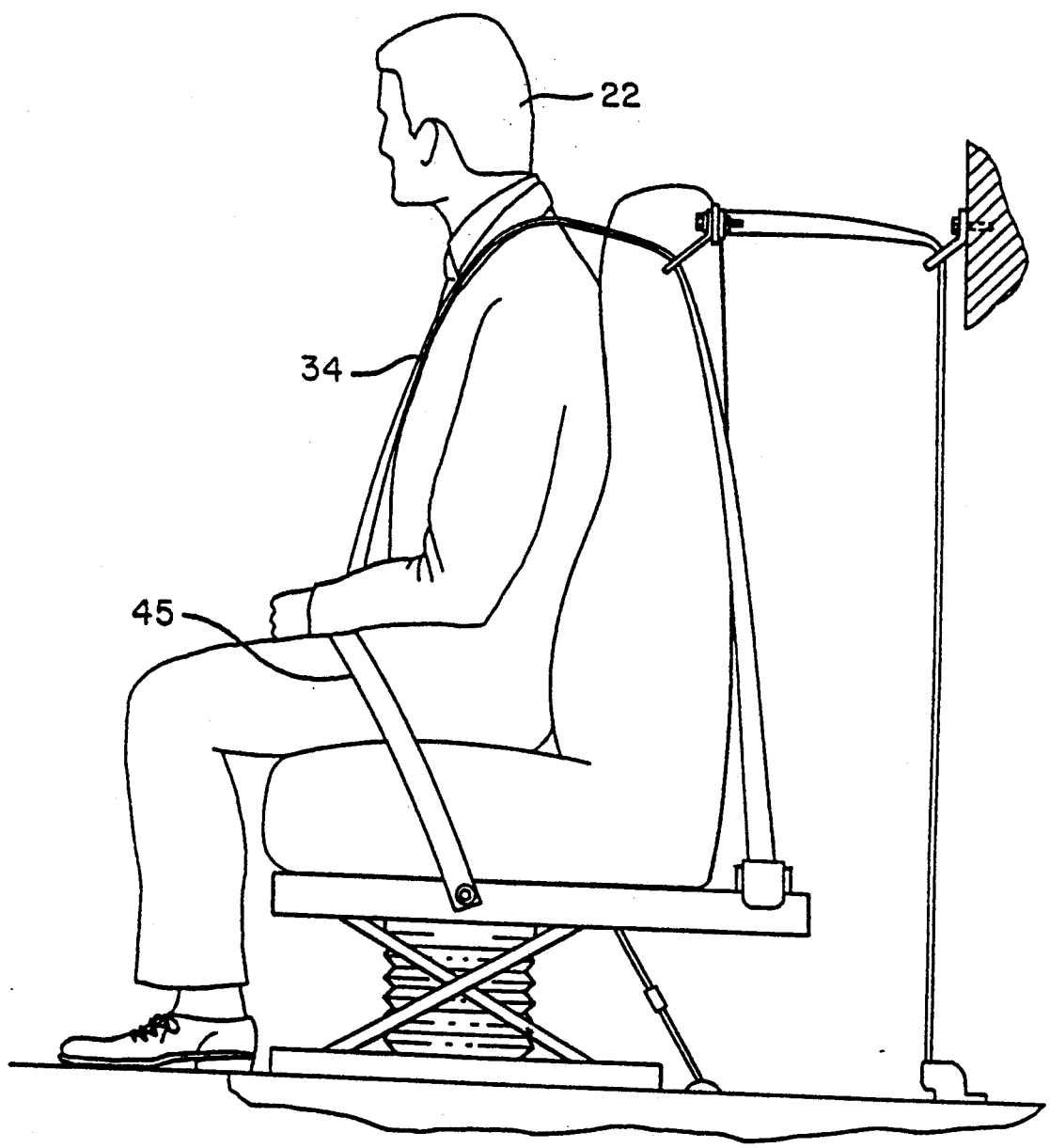
FIG. 2 is the same view as FIG. 1 only showing a person occupying the seat.
Figure 3:
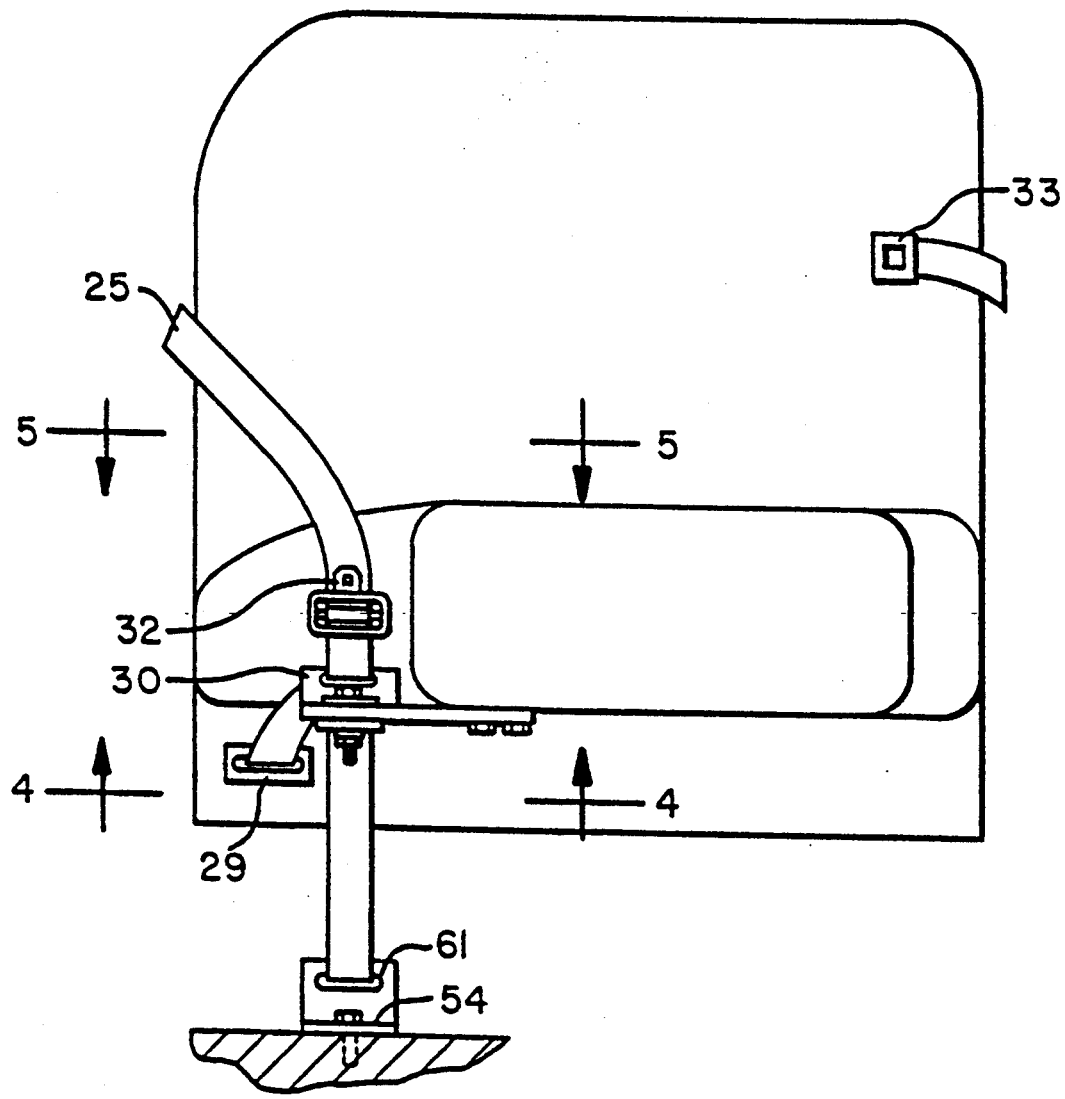
FIG. 3 is an enlarged top view of the seat of FIG. 1.

Referring now more particularly to FIGS. 1 and 2, there is shown the seat integrated seat belt system 20 incorporating the present invention. The seat includes a seat cushion 21 upon which passenger 22 sits also being supported by back support 23. Cushion 21 and back support 23 are mounted atop frame 24 which may be horizontally and vertically moved. System 20 includes a seat belt 25 having a first end 26 securely anchored by fastening device 27 to frame 24. The opposite end 28 of the belt is mounted and wound on a spindle rotatably mounted within a conventional emergency locking retractor 29. Belt 25 extends freely through a guide 30 fixedly mounted to the top portion 31 of seat back support 23. The belt extends through a conventional seat belt buckle tongue 32 which may be pulled across passenger 22 to lockingly engage a conventional seat belt buckle 33 fixedly secured to frame 24. Thus, belt 25 has a lap portion 45 extending across the lap of passenger 22 and an upper torso portion 34 extending across the chest of the passenger.

Figure 4:
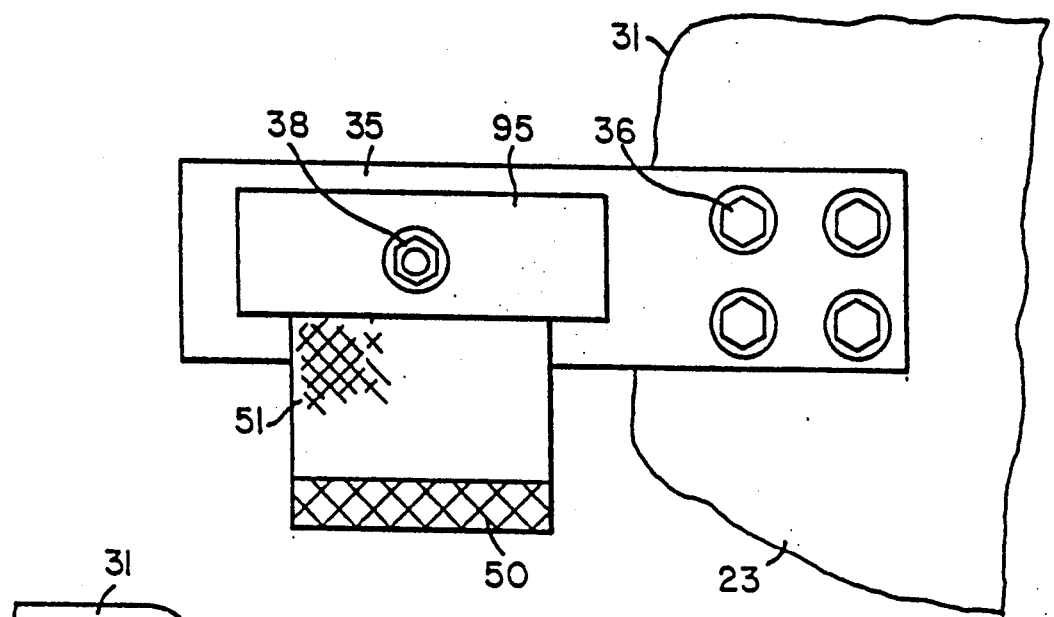
FIG. 4 is an enlarged, fragmentary, cross-sectional view taken along the line 4—4 of FIG. 3 and viewed fragmentary, in the direction of the arrows.
Figure 5:
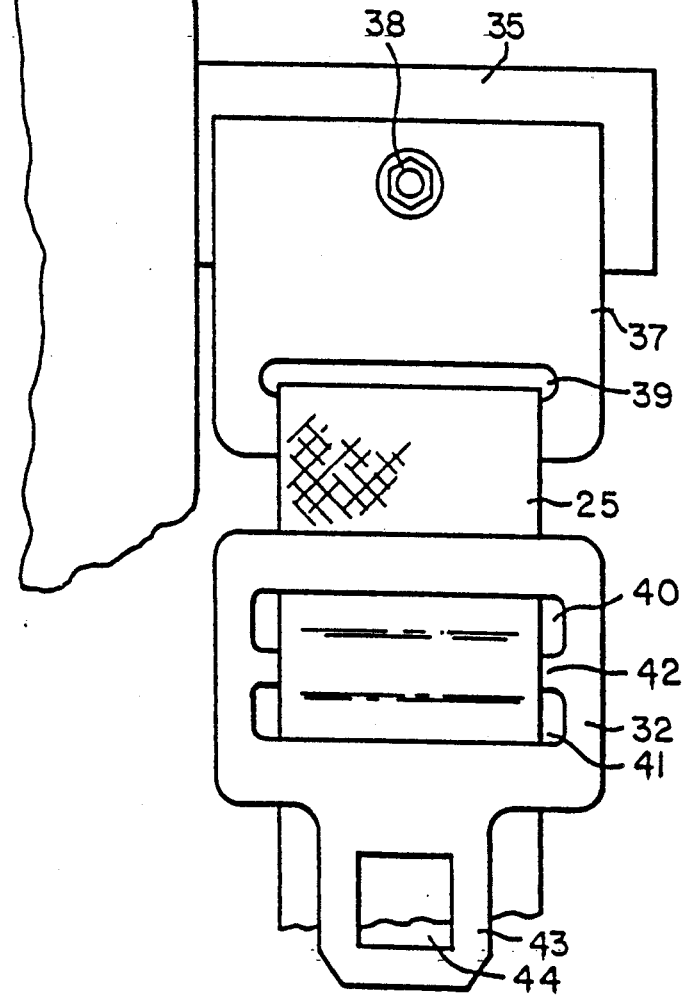
FIG. 5 is an enlarged, cross-sectional view taken along the line 5—5 of FIG. 3 and viewed in the direction of the arrows.

Anchor plate 35 (FIG. 4) is fixedly secured by conventional fastening devices 36 to the back surface of the top 31 of back support 23. A D-loop guide 37 (FIG. 5) is mounted to plate 35 by means of a fastener 38. The fastener may take the form of a bolt and nut combination. Further, the fastener may be designed to allow guide 37 to pivot about the longitudinal axis of the bolt. Guide 37 includes a slot 39 through which belt 25 freely extends. Buckle tongue 32 has a pair of spaced apart slots 40 and 41 separated by wall 42. Belt 25 extends outwardly through slot 40 and then back through slot 41 allowing the buckle tongue to be adjusted along the length of the belt for sizing of the belt portion 45 extending across the lap of the occupant. The tongue has a distal end 43 with an aperture 44 to lockingly engage a conventional seat belt buckle 33 mounted to the seat on the side opposite of the location of the opposite ends 26 and 28 of the belt.

A seat tether is provided to reduce the motion of the seat and seat belt normally resulting from vehicle motion. The tether includes a belt 50 (FIG. 1) having an outer end 51 fixedly attached to anchor plate 35 and an opposite end 52 mounted to and wound upon a spindle rotatably mounted within a conventional emergency locking retractor 53 mounted to the floor 94 of the vehicle beneath seat frame 24. A guide 54 is fixedly mounted to the vehicle thereby guiding the belt vertically upward from the retractor and then through the guide with the belt then extending horizontally to the top 31 of the seat. End 51 of belt 50 is fixedly secured to belt plate 95 (FIG. 4) in turn mounted by fastener 38 to plate 35. Thus, the distal end of belt 50 is attached to the back support 23 of the seat at the location of the mounting of the first belt guide 37. The tether system minimizes motion of the seat normally resulting from vehicle motion and, therefore, reduces motion of belt 25.

Figure 6:
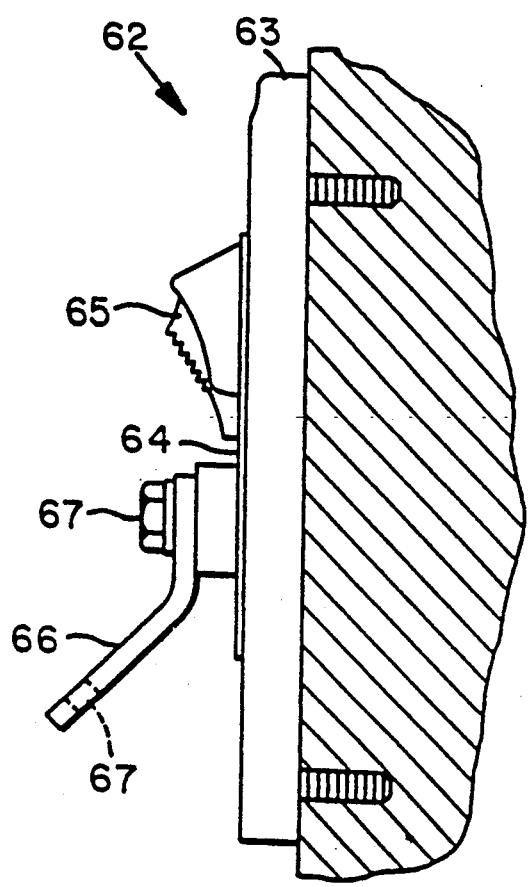
FIG. 6 is a side view of an alternate guide for the seat tether.

Tether guide 54 (FIG. 1) is fixedly mounted to the vehicle by fastener 60 and has an outwardly projecting wall 61 with a an aperture provided therein through which belt 50 extends freely. An adjustable belt guide may be utilized in lieu of the fixed guide 54. A variety of adjustable belt guides are commercially available with one such guide shown in FIG. 6. Guide 62 includes a frame 63 fixedly secured to the vehicle with frame 63 having a pair of tracks upon which is slidably mounted slide 64. A push button control 65 is mounted to slide 64 to allow for the vertical adjustment and positioning of guide 66 fixedly mounted to slide 64 by fastener 67. Aperture 67 is formed on the outwardly projecting portion of guide 66 with the belt extending freely through aperture 67. One such guide is disclosed in U.S. Pat. No. 4,652,012 with is incorporated herein by reference. Both guides 54 and 62 may be mounted to the B-pillar of the vehicle.

Figure 7:
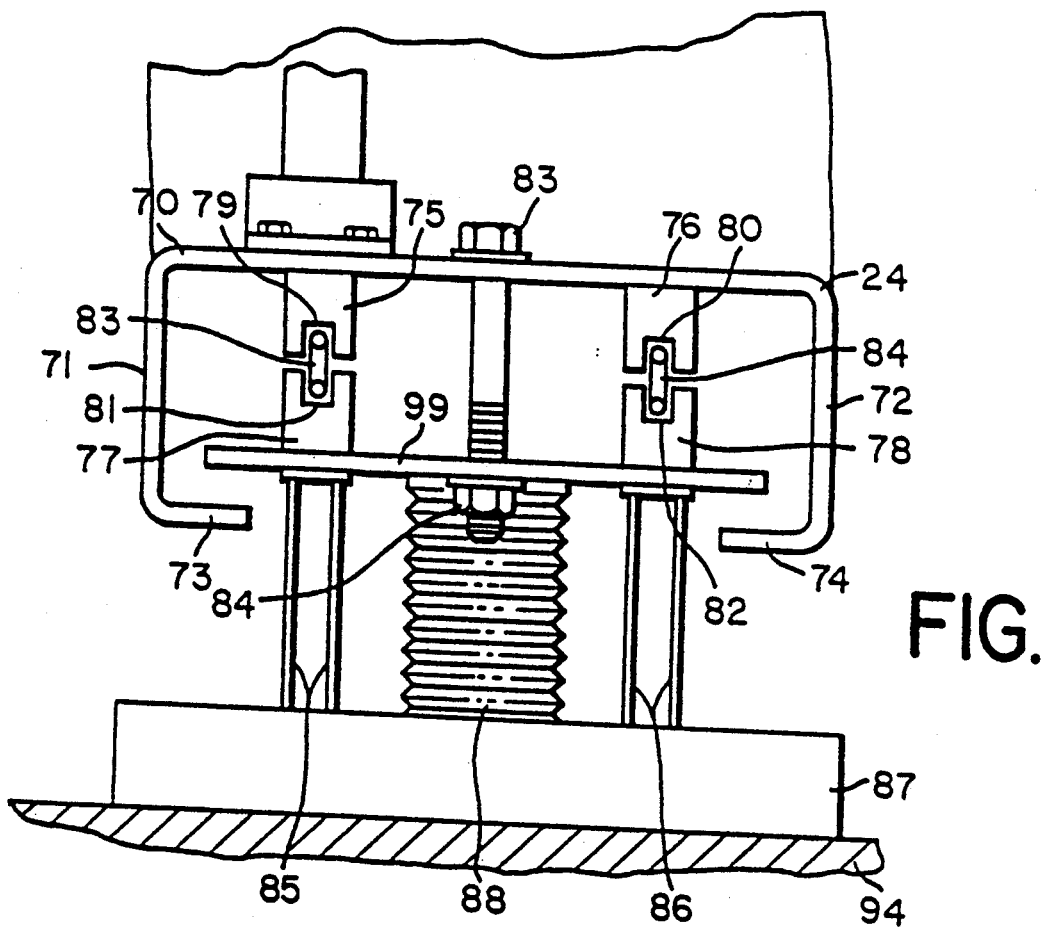
FIG. 7 is a fragmentary enlarged rear view of the seat of FIG. 1.

The seat shown in FIG. 1 is supported upon either an air or mechanical suspension allowing for adjustable, vertical movement. Seat frame 24 includes a horizontally extending wall 70 upon which the seat cushion and back support are mounted. The frame includes a pair of depending side walls 71 (FIG. 7) and 72 having inwardly turned flanges 73 and 74. A pair of upper tracks 75 and 76 are fixedly fastened to wall 70 and depend therefrom being located opposite from and aligned with a second pair of tracks 77 and 78 fixedly mounted atop base plate 99. Tracks 75 and 76 include downwardly opening grooves 79 and 80 opposed to and aligned with a pair of upwardly extending grooves 81 and 82 formed in tracks 77 and 78. Bearings 83 and 84 are located within grooves 79 through 82 allowing frame 70 to move horizontally relative to base plate 99. A load support pin or bolt 83 extends through an aperture of wall 70, and then through a slot formed in base plate 99 and is affixed thereto by nut 84. Thus, as wall 70 moves horizontally with fastener 83, base plate 79 remains stationary allowing pin 83 to move within the slot formed in plate 99.

Base plate 99 is mounted atop a pair of scissor links 85 and 86 having their top ends pivotally mounted to plate 99 and the bottom ends pivotally mounted to housing 87 mounted fixedly atop floor 94. A conventional air or mechanical suspension 88 is mounted to housing 87 having a top end affixed to base plate 99, and being operable to move the base plate and accompanying seat frame 24 and seat upwardly or downwardly. A shock absorber may also be located between base plate 99 and housing 87. Base plate 99 is normally spaced apart and above flanges 73 and 74 which may contact plate 79 during a crash thereby limiting motion of the seat frame and seat relative to the floor. A tether cable 90 is attached to and extends between floor 94 and base plate 79 providing a further motion limitation of the seat during a crash.

Retractor 29 is mounted atop and to seat frame 24 which extends rearwardly of back support 23. Likewise, the opposite end 26 of the belt is secured to the seat frame. As a result, belt 25 moves as an integral portion of the seat whenever the seat is adjusted vertically or horizontally, thus maintaining constant pressure on the occupant. Likewise, retractor 53 mounted to the vehicle floor is operable to play out or retract belt 50 depending upon the vertical or horizontal controlled motion of the seat which occurs, for example, during seat adjustment. During an emergency such as a crash, retractor 53 is operable to lock thereby applying holding force to the top end of the back portion of the seat minimizing seat motion and belt motion. During such an emergency, retractor 29 will likewise lock thereby preventing outward play of belt 25 and insuring the occupant is securely held to the seat. Notably, the restraining force exerted by belt 50 and retractor 53 relative to the seat is independent of any pressure applied to the occupant by belt 25 during emergency stops.

Retractors 29 and 53 are inertia retractors and are commercially available. Such an inertia locking retractor is disclosed in U.S. Pat. No. 4,506,844 which is herewith incorporated by reference.

The sensitivity of the emergency locking retractor 29 does not cause excessive lock up from the normal horizontal and vertical motion controlled by the occupant. That is, the retractor is operable only to lock the belt during emergency stops. Buckle 33 being affixed to frame 24 moves as a unit with belt 25 during seat motion providing for the integral relationship between the belt system and seat. Emergency locking retractor 53 is positioned low in the vehicle cab to minimize motion of belt 50 and reduce lock up in rough ride conditions. As such, retractor 53 is located lower in elevation than seat frame 24.

Many advantages result from the present invention. Typically, in order to anchor conventional seats to a vehicle, various portions of the vehicle must be strengthened. By utilizing retractor 53 and belt 50, the retractor and guide 54 may be mounted to the normal columns or strong areas of the vehicle eliminating the necessity for further reinforcement. Further, since the tether is attached to the location of the upper guide for belt 25, the upper torso is being tethered allowing for use of relatively inexpensive or unreinforced seats.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tether for holding a vehicle passenger seat with a back portion comprising:

a tether assembly mountable to a vehicle and a passenger seat therein, said tether assembly including an extendable and retractable web extending between said passenger seat in said vehicle with said tether assembly being operable via said web to allow relative motion between said passenger seat in said vehicle during passenger adjustment but limiting relative motion during emergency stops, said tether assembly including an emergency locking retractor mounted to said vehicle with said web extendable and retractable from said emergency locking retractor, said web including an outer end portion secured to said back portion of said passenger seat, said tether assembly including web guide means positioned above said emergency locking retractor and behind said back portion, said web guide means operable to guide said web upwardly from said emergency locking retractor and forwardly toward said back portion.

2. A vehicle passenger restraint system comprising:

a passenger seat movable mounted in a vehicle with said passenger seat having a upwardly extending back support;

passenger belt means releasably extending across the passenger operable to secure the passenger in the seat; and, web means mounted to the vehicle and passenger seat and having a web releasably extending therefrom with said web including a first portion secured to said back support and a second portion secured to said vehicle, said web means operable to allow said web to extend and retract therefrom as said seat controllably moves relative to said vehicle but further operable to limit movement of said web and said back support relative to said vehicle during emergency stops; and wherein:

said web means includes a web retractor mounted to said vehicle having said web wound therein; and, said passenger belt means includes a belt retractor mounted to said seat having a belt wound therein, said belt means with said belt retractor located on said seat to move with said seat maintaining constant pressure on said passenger as said seat moves relative to said vehicle whereas said web retractor is located on said vehicle limiting movement of said seat relative to said vehicle.

3. The restraint system of claim 2 and further comprising:

web guide means mounted to said vehicle above said web retractor and behind said back support, said web guide means operable when said web is connected to said back support to guide said web upwardly from said web retractor and then forwardly toward said back support.

4. The restraint system of claim 3 wherein:

said web guide means is movably mounted to said vehicle to allow vertical adjustment thereof relative to said back support.

5. The restraint system of claim 3 wherein:

said passenger belt means includes a belt guide means mounted at an upper location on said back support, said belt extends upwardly from said belt retractor freely through said belt guide means and then downwardly cross the chest of the passenger; and, said web is mounted to said back support at said upper location.

6. The restraint system of claim 5 wherein:

said belt includes an outer end portion fixed on one side of said seat, said passenger belt means includes a first locking means mounted on the opposite side of said seat and a second locking means mounted to said belt which is releasably matable with said first locking means, said belt extends from said one side across the lap of the passenger to said opposite side, then upwardly across the upper torso of the passenger to said belt guide means, then downwardly to said belt retractor which is operable to maintain pressure on the lap and the upper torso while said web retractor maintains pressure on the back support.

7. A vehicle passenger restraint system comprising:

a passenger seat movable mounted in a vehicle with said passenger seat having a upwardly extending back support;

passenger belt means releasably extending across the passenger operable to secure the passenger in the seat;

web means mounted to the vehicle and passenger seat and having a web releasably extending therefrom with said web including a first portion secured to said back support and a second portion secured to said vehicle, said web means operable to allow said web to extend and retract therefrom as said seat controllably moves relative to said vehicle but further operable to limit movement of said web and said back support relative to said vehicle during emergency stops; and, seat mounting means secured to and between said vehicle and said seat and operable to allow vertical and horizontal movement of said seat relative to said vehicle with said passenger belt means isolated from said movement maintaining constant pressure on the passenger whereas said web means extending between said seat and vehicle independent of directly applying pressure to said passenger while being operable to limit movement of said seat during emergency stops.

8. The restraint system of claim 7 wherein:

said seat mounting means includes a support channel mounted to and beneath said seat, said channel includes a pair of lower mutually opposed and inwardly extending flanges, said seat mounting means further includes a base mounted to said vehicle and located within said channel immediately above said flanges which cooperatively with said base to limit vertical relative motion between said seat and said vehicle.

9. The restraint system of claim 7 wherein:

said seat mounting means includes a rearwardly extending plate affixed to said seat, said seat mounting means further includes a post and slot combination provided on said plate and said base allowing limited horizontal motion therebetween but securing said seat to said vehicle during an emergency stop.

10. A seat integrated three point seat belt system comprising:

a passenger seat movably mountable in a vehicle and including a seat portion and a back portion, said seat being normally movable during passenger adjustment;

a three point belt assembly including a belt retractor mounted to said passenger seat and further including a belt extendable therefrom, said assembly includes an upper belt guide provided on said back portion and a releasable lock mounted to passenger seat on one side thereof, said belt extending from said belt retractor through said belt guide downwardly across the passenger to said lock and then back across the passenger being affixed to and on a side opposite to said one side; and, tether means mountable to said vehicle and said passenger seat, said tether means including an extendable and retractable web extending between said passenger seat and said vehicle with said tether means being operable via said web to allow relative motion between said passenger seat and said vehicle during said passenger adjustment but limiting relative motion during emergency stops.

11. The system of claim 10 wherein:

said tether means includes an emergency locking retractor mounted to said vehicle with said web extendable and retractable from said emergency locking retractor, said web includes an outer end portion secured to said back portion of said passenger seat.

12. The system of claim 11 and further comprising:

support means provided on an upper location on said back portion with said belt guide provided thereon and said outer end portion of said web secured thereto.

13. The system of claim 12 wherein:

said emergency locking retractor is mounted lower than said belt retractor.

14. The system of claim 13 wherein:

said tether means includes web guide means mounted to said vehicle above said emergency locking retractor and behind said back portion, said web guide means operable to guide said web upwardly from said emergency locking retractor and then forwardly toward said back portion.

15. A tether for holding a vehicle passenger seat with a back portion comprising:

a tether assembly mountable to a vehicle and a passenger seat therein, said tether assembly including an extendable and retractable web extending between said passenger seat and said vehicle with said tether assembly being operable via said web to allow relative motion between said passenger seat and said vehicle during passenger adjustment but limiting relative motion during emergency stops; and wherein: said tether assembly includes an emergency locking retractor mounted to said vehicle with said web extendable and retractable from said emergency locking retractor, said web includes an outer end portion secured to said back portion of said passenger seat, said emergency locking retractor is mounted lower than said passenger seat, said tether assembly includes web guide means mounted to said vehicle above said emergency locking retractor and behind said back portion, said web guide means operable to guide said web upwardly from said emergency locking retractor and then forwardly toward said back portion.

16. The tether of claim 15 wherein:

said web guide means is movably mounted to said vehicle to allow for adjustment relative to said back portion of said passenger seat.

* * * * *